(12) United States Patent
Glatfelter et al.

(10) Patent No.: US 10,231,086 B2
(45) Date of Patent: Mar. 12, 2019

(54) APPARATUS, SYSTEM, AND METHOD FOR MAINTENANCE OF COMPLEX STRUCTURES

(71) Applicant: The Boeing Company, Chicago, IL (US)

(72) Inventors: John W. Glatfelter, West Chester, PA (US); John S. Zivic, Chandler, AZ (US)

(73) Assignee: The Boeing Company, Chicago, IL (US)

( * ) Notice: Subject to any disclaimer, the term of this patent is extended or adjusted under 35 U.S.C. 154(b) by 30 days.

(21) Appl. No.: 15/164,383

(22) Filed: May 25, 2016

(65) Prior Publication Data

US 2017/0347233 A1 Nov. 30, 2017

(51) Int. Cl.
| | | |
|---|---|---|
| H04W 4/23 | (2018.01) | |
| H04W 4/02 | (2018.01) | |
| H04W 4/80 | (2018.01) | |
| H04W 4/18 | (2009.01) | |
| H04W 12/08 | (2009.01) | |
| B64F 5/00 | (2017.01) | |

(Continued)

(52) U.S. Cl.
CPC ............... *H04W 4/023* (2013.01); *B64F 5/00* (2013.01); *G06Q 10/06* (2013.01); *G06Q 10/20* (2013.01); *H04W 4/18* (2013.01); *H04W 4/80* (2018.02); *H04W 12/08* (2013.01); *G07C 2205/02* (2013.01)

(58) Field of Classification Search
CPC .. G06F 17/30572; G06Q 10/06; G06Q 10/00; G06Q 10/20; G06Q 50/30; G07C 5/006; B64F 5/60; B64F 5/0045; B64F 5/0081
See application file for complete search history.

(56) References Cited

U.S. PATENT DOCUMENTS

| | | | |
|---|---|---|---|
| 2009/0254403 A1* | 10/2009 | Nagalla | G06Q 10/06 705/7.38 |
| 2011/0106551 A1* | 5/2011 | Durand | G01S 5/0027 705/1.1 |
| 2013/0335611 A1 | 12/2013 | Roman et al. | |

(Continued)

FOREIGN PATENT DOCUMENTS

| | | |
|---|---|---|
| EP | 3021265 | 5/2016 |
| GB | 2513709 | 11/2014 |

OTHER PUBLICATIONS

European Search Report for EP Patent Application No. 17159917.8 dated Sep. 15, 2017.

(Continued)

*Primary Examiner* — Liton Miah
(74) *Attorney, Agent, or Firm* — Kunzler, PC

(57) ABSTRACT

Disclosed herein is an apparatus that includes a personnel location device that is configured to determine a proximity of personnel to a structure. The apparatus also includes a data filter that is configured to filter maintenance-procedure data from an electronic maintenance technical publication responsive to, at least in part, the proximity of personnel to the structure determined by the personnel location device. Additionally, the data filter is configured to create a first filtered electronic maintenance technical publication that includes the maintenance-procedure data filtered from the electronic maintenance technical publication.

26 Claims, 5 Drawing Sheets

(51) Int. Cl.
   *G06Q 10/06*   (2012.01)
   *G06Q 10/00*   (2012.01)

(56) References Cited

U.S. PATENT DOCUMENTS

| | | | |
|---|---|---|---|
| 2016/0253364 A1* | 9/2016 | Gomadam | G06F 17/30312 |
| | | | 707/739 |
| 2017/0004610 A1* | 1/2017 | Lamkin | G06T 7/0002 |
| 2017/0235796 A1* | 8/2017 | Vali | G06F 17/30516 |
| | | | 706/11 |
| 2017/0291723 A1* | 10/2017 | Reddy | B64F 5/0045 |

OTHER PUBLICATIONS

Extended European Search Report for EP Patent Application No. 17159917.8 dated Jan. 4, 2018.

* cited by examiner

APPARATUS, SYSTEM, AND METHOD FOR MAINTENANCE OF COMPLEX STRUCTURES

FIELD

This disclosure relates generally to the maintenance of complex structures, and more particularly to filtering maintenance-procedure data from an electronic maintenance technical publication.

BACKGROUND

Guidance (e.g., instructions) for performing maintenance on various components and assemblies of a complex structure can be stored in an electronic maintenance technical publication. Electronic maintenance technical publications may contain information for many, if not all, repairable or replaceable components or assemblies of a structure. Accordingly, for complex structures, with hundreds or thousands of repairable or replaceable components and assemblies, the electronic maintenance technical publication associated with such complex structures can be quite voluminous.

SUMMARY

The subject matter of the present disclosure has been developed in response to the present state of the art, and in particular, in response to the limitations of conventional electronic maintenance technical publications. Accordingly, the subject matter of the present disclosure includes an apparatus, system, and method for filtering an electronic maintenance technical publication to aid in the maintenance of a complex structure that overcome at least some of the above-discussed shortcomings of the prior art. The present disclosure allows for quickly and efficiently locating, in an electronic maintenance technical publication, information for maintaining a particular component or assembly of a complex structure can be difficult.

According to one embodiment, an apparatus includes a personnel location device that is configured to determine a proximity of personnel to a structure. The apparatus also includes a data filter that is configured to filter maintenance-procedure data from an electronic maintenance technical publication responsive to, at least in part, the proximity of personnel to the structure determined by the personnel location device. Additionally, the data filter is configured to create a first filtered electronic maintenance technical publication that includes the maintenance-procedure data filtered from the electronic maintenance technical publication.

In some implementations of the apparatus, the personnel location device includes a global positioning system (GPS) device. The personnel location device can further include a data storage device that includes information identifying GPS coordinates of multiple objects of the structure. The personnel location device can be further configured to determine an object of the structure in closest proximity to the personnel. The maintenance-procedure data filtered from the electronic maintenance technical publication by the data filter can consist of maintenance-procedure data corresponding with the object of the structure in closest proximity to the personnel.

According to certain implementations, the personnel location device includes identification tags that are fixed to respective objects of multiple objects of the structure. Each of the identification tags includes information identifying the respective object to which the identification tag is fixed. The personnel location device further includes an identification tag reader that is configured to detect identification tags and receive the information identifying the objects from the identification tags. The tag reader can be configured to detect the identification tag in closest proximity to the personnel and receive information from the identification tag identifying the object to which the identification tag in closest proximity to the personnel is fixed. The personnel location device can be further configured to determine an object of the structure in closest proximity to the personnel responsive to the information from the identification tag identifying the object to which the identification tag in closest proximity to the personnel is fixed. The maintenance-procedure data filtered from the electronic maintenance technical publication by the data filter can consist of maintenance-procedure data corresponding with the object of the structure in closest proximity to the personnel. In some implementations, the maintenance-procedure data corresponding with the object of the structure in closest proximity to the personnel consists of maintenance-procedure data for the object of the structure in closest proximity to the personnel and maintenance-procedure data for objects near the object of the structure in closest proximity to the personnel.

According to some implementations, the apparatus further includes a personnel identification module that is configured to identify the personnel and obtain at least one credential of the personnel responsive to, at least in part, an identification of the personnel by the personnel identification module. The data filter can be further configured to filter maintenance-procedure data from the first filtered electronic maintenance technical publication responsive to, at least in part, the at least one credential of the personnel determined by the personnel identification module. Also, the data filter can be configured to create a second filtered electronic maintenance technical publication that includes the maintenance-procedure data filtered from the first filtered electronic maintenance technical publication. The at least one credential of the personnel may include a technical expertise. The personnel identification module can identify the personnel responsive to, at least in part, unique identification data received from the personnel.

In another embodiment, a system includes an electronic maintenance technical publication that includes maintenance-procedure data corresponding with multiple objects of a structure. The system also includes a personnel location device that is configured to determine a proximity of personnel to a structure. Furthermore, the system includes a data filter that is configured to access the electronic maintenance technical publication, filter maintenance-procedure data from the electronic maintenance technical publication responsive to, at least in part, the proximity of personnel to the structure determined by the personnel location device, and create a first filtered electronic maintenance technical publication that includes the maintenance-procedure data filtered from the electronic maintenance technical publication. The system additionally includes a display that is configured to display the first filtered electronic maintenance technical publication.

In some implementations of the system, the structure includes an aircraft and the multiple objects include separate components or assemblies of the aircraft.

According to certain implementations, the system further includes a personnel database that includes credentials of the personnel. The data filter can be further configured to access the personnel database to obtain credentials of the personnel, filter maintenance-procedure data from the first filtered electronic maintenance technical publication responsive to, at least in part, the at least one credential of the credentials of the personnel, and create a second filtered electronic maintenance technical publication that includes the maintenance-procedure data filtered from the first filtered electronic maintenance technical publication.

In some implementations of the system, the personnel location device includes a mobile device and the mobile device includes the data filter.

According to some implementations of the system, the electronic maintenance technical publication is indexed by three-dimensional position of personnel relative to the structure.

In certain implementations of the system, the personnel location device includes a global positioning system (GPS) device. The personnel location device also includes identification tags that are fixed to respective objects of multiple objects of the structure and each include information identifying the respective object to which the identification tag is fixed. Additionally, the personnel location device includes an identification tag reader that is configured to detect identification tags and receive the information identifying the objects from the identification tags.

In yet another embodiment, a computer program product includes a computer readable storage medium having program instructions embodied therewith. The program instructions are readable/executable by a processor to cause the processor to determine a proximity of personnel to a structure, filter maintenance-procedure data from an electronic maintenance technical publication responsive to, at least in part, the proximity of personnel to the structure, and create a first filtered electronic maintenance technical publication comprising the maintenance-procedure data filtered from the electronic maintenance technical publication.

According to some implementations of the computer program product, the program instructions further cause the processor to obtain at least one credential of the personnel, filter maintenance-procedure data from the first filtered electronic maintenance technical publication responsive to, at least in part, the at least one credential of the personnel, and create a second filtered electronic maintenance technical publication that includes the maintenance-procedure data filtered from the first filtered electronic maintenance technical publication.

In yet certain implementations of the computer program product, determining the proximity of personnel to the structure includes determining a first precursor proximity of the personnel to the structure responsive to, at least in part, global positioning system (GPS) data received from a mobile device fixed to the personnel, determining a second precursor proximity of the personnel to the structure responsive to, at least in part, information on identification tags fixed to the structure and received from an identification tag reader, comparing the first precursor proximity and the second precursor proximity.

According to another embodiment, a method includes obtaining at least one credential of the personnel, filtering maintenance-procedure data from an electronic maintenance technical publication responsive to, at least in part, the at least one credential of the personnel, and creating a first filtered electronic maintenance technical publication that includes the maintenance-procedure data filtered from the electronic maintenance technical publication.

In some implementations, the method further includes determining a proximity of the personnel to a structure, filtering maintenance-procedure data from the first filtered electronic maintenance technical publication responsive to, at least in part, the proximity of the personnel to the structure, and creating a second filtered electronic maintenance technical publication that includes the maintenance-procedure data filtered from the first filtered electronic maintenance technical publication.

According to yet another embodiment, an apparatus includes a personnel identification module that is configured to identify personnel and obtain at least one credential of the personnel responsive to, at least in part, an identification of the personnel by the personnel identification module. The apparatus also includes a data filter that is configured to filter maintenance-procedure data from an electronic maintenance technical publication responsive to, at least in part, the at least one credential of the personnel determined by the personnel identification module, and create a first filtered electronic maintenance technical publication that includes the maintenance-procedure data filtered from the electronic maintenance technical publication.

In certain implementations, the apparatus further includes a personnel location device that is configured to determine a proximity of personnel to a structure. The data filter is further configured to filter maintenance-procedure data from the first filtered electronic maintenance technical publication responsive to, at least in part, the proximity of the personnel determined by the personnel location device, and create a second filtered electronic maintenance technical publication that includes the maintenance-procedure data filtered from the first filtered electronic maintenance technical publication.

According to an implementation, the apparatus further includes a display that is configured to display the first filtered electronic maintenance technical publication.

In another embodiment, a method includes determining a proximity of personnel to a structure, filtering maintenance-procedure data from an electronic maintenance technical publication responsive to, at least in part, the proximity of the personnel to the structure, and creating a first filtered electronic maintenance technical publication comprising the maintenance-procedure data filtered from the electronic maintenance technical publication. The method may further include obtaining at least one credential of the personnel, filtering maintenance-procedure data from the first filtered electronic maintenance technical publication responsive to, at least in part, the at least one credential of the personnel, and creating a second filtered electronic maintenance technical publication that includes the maintenance-procedure data filtered from the first filtered electronic maintenance technical publication.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
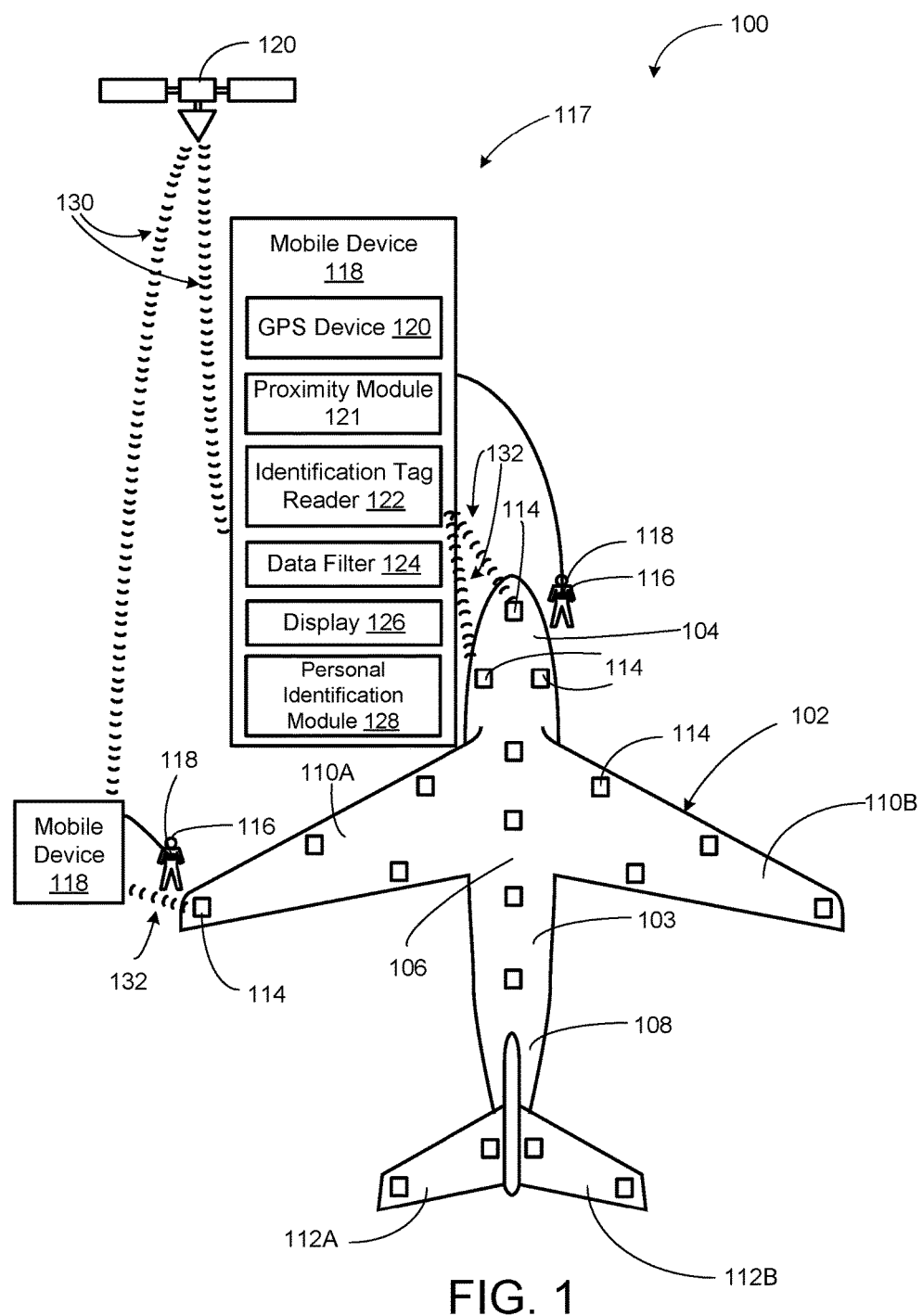
FIG. 1 is a schematic block diagram of a system for maintaining a structure, according to one or more embodiments of the present disclosure.

Referring to FIG. 1, one embodiment of a system 100 for maintaining a structure, such as aircraft 102, is shown. The aircraft 102, according to one implementation, includes a body 103 or fuselage, a pair of wings 110A, 110B coupled to and extending from the body 103, a vertical stabilizer 113 coupled to the body 103, and a pair of horizontal stabilizers 112A, 112B coupled to the body 103 and/or the vertical stabilizer 113. The body 103 includes a forward section 104, a middle section 106, and a rearward section 108. Although not particularly referenced, the aircraft 102 includes multiple objects each capable of requiring maintenance. Maintenance of an object can include repair, inspection, and/or replacement of the object. Each portion of the aircraft 102 may include one or more objects. An object can be any of various components or assemblies (e.g., systems) of the aircraft 102. Generally, an assembly is a combination of components. A component can be any of various types of components, such as, for example, electrical, mechanical, hydraulic, pneumatic, and/or computer components. In one particular example, landing gear (not shown) of the aircraft 102 can form an assembly or a system of the aircraft 102, and a hydraulically-powered piston of the landing gear can be an individual component of the aircraft 102.

The aircraft 102 includes features representative of a commercial passenger or military transport aircraft. However, the aircraft 102 can be any of various other types of commercial or non-commercial aircraft, such as personal aircraft, fighter jets, helicopters, spacecraft, and the like. Moreover, although an aircraft is depicted in the illustrated embodiment, in other embodiments, another mobile complex structure, such as a vehicle (e.g., boat, automobile, etc.) or a non-mobile complex structure (e.g., building, bridge, machinery, factory, etc.) can be considered without departing from the essence of the present disclosure. In other words, as referred to herein, unless otherwise noted, a structure can be any of various structures, including, but not limited to, an aircraft.

Figure 3:
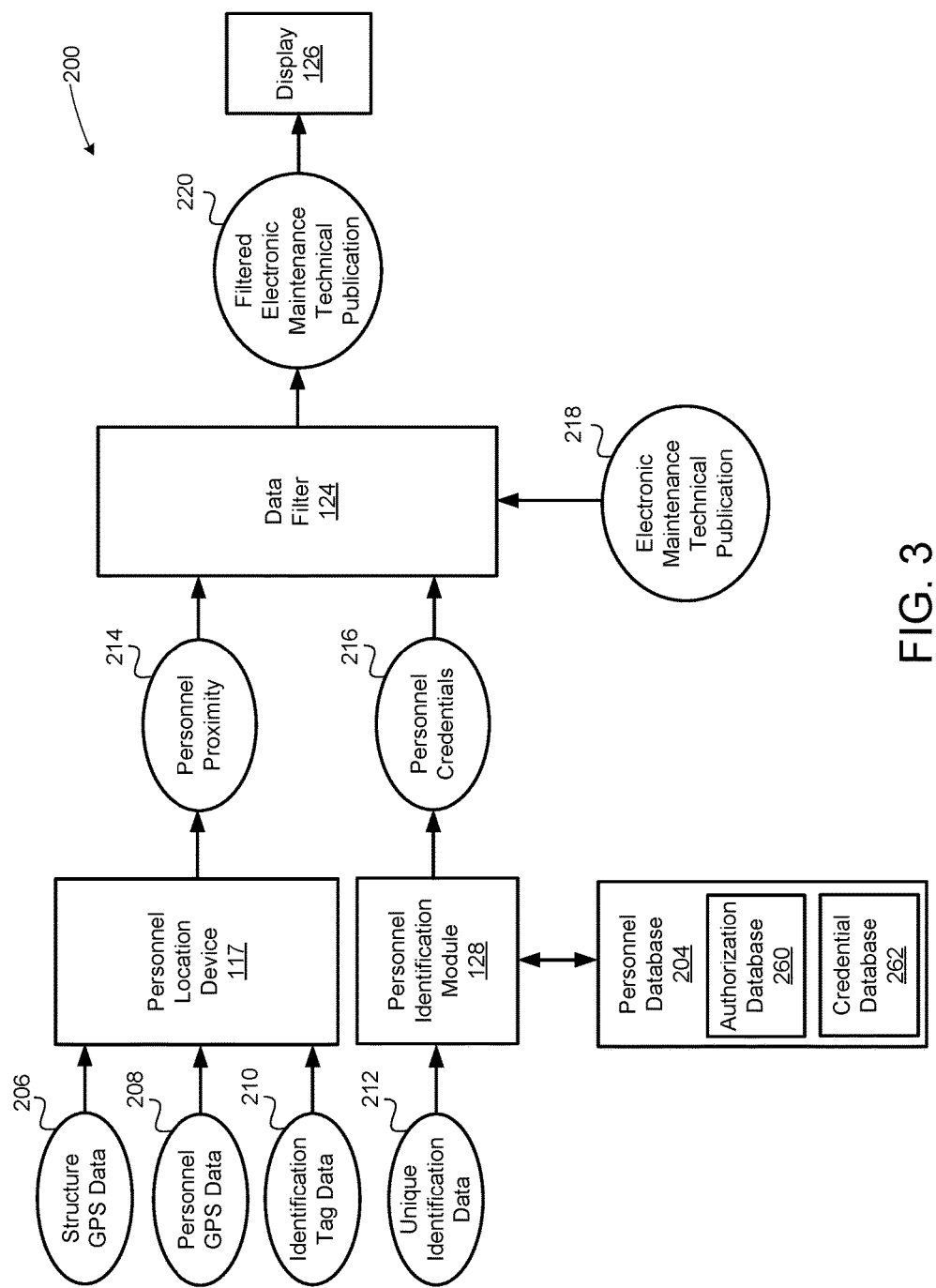
FIG. 3 is a schematic flow diagram of a system for maintaining a structure, according to one or more embodiments of the present disclosure.

Guidance (e.g., instructions) for performing maintenance on the various components and assemblies of an aircraft can be stored in an electronic maintenance technical publication 218 as maintenance-procedure data (see, e.g., FIG. 3). Maintenance-procedure data is any electronic data that includes information on maintenance procedures for one or more objects of a structure, such as the aircraft 102. The electronic maintenance technical publication 218 can be an interactive electronic technical manual. The information can include text, graphics, audio, video, or other modes of communication that may assist personnel with maintenance of an object. For example, the electronic maintenance technical publication 218 may include step-by-step instructions on how to repair and/or replace any of various components or assemblies of a structure. In certain implementations, the electronic maintenance technical publication contains maintenance-procedure data for most, if not all, repairable or replaceable components or assemblies of a structure. Accordingly, for complex structures, such as aircraft or factories, with hundreds, if not thousands, of repairable or replaceable components and assemblies, the electronic maintenance technical publication 218 associated with such complex structures can be quite voluminous. Because of this, quickly and efficiently locating, in an electronic maintenance technical publication, maintenance-procedure data for a particular component or assembly of a complex structure can be difficult. The electronic maintenance technical publication 218 can be located remote from the structure being maintained. For example, the electronic maintenance technical publication 218 can be stored on an offsite database and be accessible by personnel maintaining the structure via wired or wireless communication hardware and protocols. Alternatively, the electronic maintenance technical publication 218 can be stored local to personnel maintaining the structure, such as on a mobile device handled by the personnel, and can be accessible via a user interface of the mobile device. Generally, as will be described in more detail below, whether local or remote, access to the electronic maintenance technical publication 218 is limited to those personnel with verifiable identifications and/or credentials.

In some embodiments, the aircraft 102 includes multiple identification tags 114 fixed to the aircraft 102. The identification tags 114 are affixed to an external surface of the aircraft 102 in some implementations. In other implementations, the identification tags 114 are embedded within (e.g., sandwiched between layers of) the aircraft 102. The identification tags 114 can be any of various tags or sensors capable of electronically storing and transmitting information. In one example, the identification tags 114 are passive radio-frequency identification (RFID) tags that transmit information using energy collected from the interrogating radio waves of an identification tag reader. However, the identification tags 114 can be active RFID tags that transmit information via power from power sources (e.g., batteries) local to the RFID tags. In other examples, each identification tag 114 is one or more proximity sensors. Generally, each identification tag 114 includes information identifying the object of the aircraft 102 to which the identification tag 114 is attached. Accordingly, the information stored on and transmitted by the identification tags 114 is different from each other. In one implementation, each assembly or system of the aircraft includes an identification tag 114, with information identifying the assembly or system, fixed to the assembly or system. For example, one identification tag 114, identifying front landing gear, can be fixed to a front landing gear of the aircraft 102 and one identification tag 114, identifying rear landing gear, can be fixed to each of rear landing gear of the aircraft 102. In yet another implementation, additional identification tags 114, each identifying a wheel, can be fixed to one or more wheels of each of the front and rear landing gears.

The system 100 also includes a personnel location device 117 that is configured to automatically determine the proximity of personnel to the aircraft 102. In some implementations, the personnel location device 117 includes a GPS device 120, an identification tag reader 122, and a proximity module 121. According to the embodiment of FIG. 1, the GPS device 120, identification tag reader 122, and proximity module 121 form part of a mobile device 118. In some embodiments, the mobile device 118 is any of various small and transportable computing devices, such as, for example, laptops, tablets, smartphones, smartwatches, stand-alone positioning devices, and the like. According to certain implementations, the mobile device 118 is handled by personnel 116 assigned to maintain the aircraft 102. The mobile device 118 can be handled by personnel 116 by manually holding the mobile device 118 in one implementation, or attaching the mobile device 118 onto the person of the personnel 116 (e.g., on a belt, in a pocket, etc.) in another implementation. The mobile device 118 includes various software (e.g., a computer program product), firmware, and/or hardware for promoting an automatic determination of the proximity of personnel 116 to the aircraft 102, and, more specifically, the proximity of personnel 116 to specific objects of the aircraft 102.

According to one embodiment, the mobile device 118 includes a global positioning system (GPS) device 120 or tool. The GPS device 120 includes a GPS receiver that receives a signal 130 from multiple satellites 119. Based on the signals 130 received from the satellites 119, the GPS device 120 computes the GPS coordinates, and thus a three-dimensional (3-D) position, of the mobile device 118, which corresponds with the 3-D position of the personnel 116 handling the mobile device 118. The GPS device 120 also receives and/or stores GPS coordinates or the 3-D position of the aircraft 102. The 3-D position of the aircraft 102 can be determined by another GPS device, local to the aircraft 102, and communicated to the GPS device 120. Furthermore, the 3-D position of the aircraft 102 includes the 3-D positions of multiple objects of the aircraft 102. According to one embodiment, the 3-D positions of the objects of the aircraft 102 are inferred based on known locations of the objects on the aircraft 102. In other words, by knowing where a component or assembly is located on an aircraft 102, the GPS coordinates or 3-D position of the component or assembly can be inferred.

The mobile device 118 further includes a proximity module 121 that is configured to automatically determine the proximity of personnel 116 to specific objects of the aircraft 102 by, in one implementation, comparing the 3-D position of the mobile device 118 and the 3-D positions of the objects of the aircraft 102. Generally, the proximity of personnel 116 to specific objects of the aircraft 102 is equal to the length of a vector between the 3-D position of the mobile device 118 and the 3-D positions of the objects of the aircraft 102. In this manner, the proximity module 121 can individually determine the proximity of personnel 116, handling the mobile device 118, to each of the objects of the aircraft 102. The proximity module 121 is further configured to compare the proximities of personnel 116 to the objects of the aircraft 102 and determine the object of the aircraft 102 in closest proximity to the personnel. The object of the aircraft 102 in closest proximity to the personnel 116 is the object defining a vector, between the object and the mobile device 118, with the shortest length.

According to some embodiments, the mobile device 118 additionally includes an identification tag reader 122 or scanner. The identification tag reader 122 includes software (e.g., a computer program product), firmware, and/or hardware configured to generate interrogating radio waves, directed towards one or more of the identification tags 114 of the aircraft 102, and receive information transmitted from the identification tags 114 via signals 132. Accordingly, by activating the identification tags 114 of the aircraft 102, the identification tag reader 122 can obtain information concerning the objects of the aircraft 102 to which the identification tags 114 are attached. For example, the information obtained from an identification tag 114 includes an identification of the object (e.g., component or assembly) to which the identification tag 114 is attached.

Additionally, the identification tag reader 122 may determine the proximity of the identification tags 114, activated by the identification tag reader 122, to the identification tag reader 122 based, at least in part, on the intensity of the signals received from the identification tags 114. Generally, the higher the intensity of the signal, the closer in proximity the identification tag 114 is to the identification tag reader 122. Accordingly, the proximity module 121 can be configured to automatically determine the proximity of personnel 116 to specific objects of the aircraft 102 by, in one implementation, correlating the intensities of the signals from the identification tags 114 fixed to the objects of the aircraft 102 to distances (e.g., vector lengths) between the identification tags 114 and the mobile device 118. In this additional or alternative manner, the proximity module 121 can individually determine the proximity of personnel 116, handling the mobile device 118, to each of the objects of the aircraft 102. The proximity module 121 is further configured to compare the proximities of personnel 116 to the objects of the aircraft 102, determined from the intensity of the signals transmitted from the identification tags 114, and determine the object of the aircraft 102 in closest proximity to the personnel 116.

In some implementations, the proximity of the object of the aircraft 102 in closest proximity to the personnel 116, as determined from GPS coordinates of the mobile device 118, is a first precursor proximity, and the proximity of the object of the aircraft 102 in closest proximity to the personnel 116, as determined from an identification tag 114 on the aircraft 102, is a second precursor proximity. The proximity module 121 can be configured to determine the object in closest proximity to the personnel 116 by comparing the first precursor proximity and the second precursor proximity. In one implementation, the proximity module 121 assigns, as the object in closest proximity to the personnel 116, the object associated with the lowest of the first and second precursor proximities. Alternatively, in some implementations, the proximity module 121 assigns, as the object in closest proximity to the personnel 116, the object associated with the highest weighted of the first and second precursor proximities. The first precursor proximity can be weighted differently compared to the second precursor proximity based on certain factors, such as the availability or strength of a GPS signal or the availability or strength of a signal from an identification tag 114. For example, if a GPS signal is not available (e.g., when personnel are inside an object of the aircraft 102), the second precursor proximity can be more heavily weighted than the first precursor proximity.

The system 100 further includes a data filter 124. The data filter 124 is configured to automatically filter maintenance-procedure data from the electronic maintenance technical publication 218 responsive to (e.g., based on), at least in part, the proximity of personnel 116 to the aircraft 102 as determined by the personnel location device 117. As presented above, the proximity of personnel 116 to the aircraft 102 can be expressed as the object of the aircraft 102 in closest proximity to the personnel 116. Filtering maintenance-procedure data from the electronic maintenance technical publication 218 can include retrieving or separating, from the rest of the maintenance-procedure data in the electronic maintenance technical publication 218, only the maintenance-procedure data corresponding with the object in closest proximity to the personnel 116. The maintenance-procedure data corresponding with the object in closest proximity to the personnel 116 includes just the maintenance-procedure data for the object in some implementations. However, in other implementations, the maintenance-procedure data corresponding with the object in closest proximity to the personnel 116 includes maintenance-procedure data for the object in closest proximity and neighboring objects.

The data filter 124 is further configured to automatically create a filtered electronic maintenance technical publication 220 (see, e.g., FIG. 3) with just the maintenance-procedure data retrieved or filtered from the electronic maintenance technical publication 218. In other words, the filtered electronic maintenance technical publication consists of only the maintenance-procedure data retrieved or filtered from the electronic maintenance technical publication 218. Accordingly, the filtered electronic maintenance technical publication 220 is smaller or contains less maintenance-procedure data than the electronic maintenance technical publication 218. In some implementations, the filtered electronic maintenance technical publication 220 contains less than or equal to $\frac{1}{100}^{th}$ of the maintenance-procedure data in the electronic maintenance technical publication 218. Because the filtered electronic maintenance technical publication 220 is significantly smaller than the electronic maintenance technical publication 218, personnel 116 can quickly and efficiently locate information for maintaining a particular component or assembly of the aircraft 102 or other complex structure, such as by scrolling through maintenance-procedure data pertaining to just the object in closest proximity to personnel 116 and objects near to the object in closest proximity to personnel 116.

Moreover, because maintenance-procedure data is automatically filtered from the electronic maintenance technical publication 218 and a filtered electronic maintenance technical publication is automatically created in response to, at least in part, an automatic determination of the proximity of personnel 116 to the aircraft 102, providing personnel 116 with maintenance-procedure data targeting a particular object of the aircraft 102 is performed largely without manual input from the personnel 116. In some embodiments, the filtered electronic maintenance technical publication 220 is dynamically adjusted in response to, at least in part, a change in the proximity of the personnel 116 to the aircraft 102. More particularly, as personnel 116 move from one object of the aircraft 102 to another object of the aircraft 102, the object of the aircraft 102 in closest proximity to the personnel 116 changes, and thus the maintenance-procedure data filtered from the electronic maintenance technical publication 218 also changes. In some implementations, such changes to the maintenance-procedure data filtered from the electronic maintenance technical publication 218 can change seamlessly as the personnel moves from object to object on the aircraft 102.

In the embodiment illustrated in FIG. 1, the mobile device 118 further includes a display 126, which can be configured to display the filtered electronic maintenance technical publication 220 to the personnel 116. Additionally, the display 126 of the mobile device 118 may be utilized as a graphical user interface for receiving input from the personnel as described below.

Referring again to FIG. 1, the mobile device 118 also includes a personnel identification module 128. The personnel identification module 128 is configured to identify the personnel 116. In one implementation, the personnel identification module 128 receives unique identification data (e.g., username, password, biometrics, etc.) from personnel 116. The unique identification data can be user input received via the display 126 of the mobile device 118. The personnel identification module 128 compares the unique identification data from the personnel 116 with personal identification data in a database to verify the identity of the personnel 116. If the unique identification data received from the personnel 116 matches corresponding personal identification data in the database, the identity of the personnel 116 is verified and potential access to a filtered electronic maintenance technical publication 220, or the electronic maintenance technical publication 218, is granted. However, if the identity of the personnel 116 cannot be verified, then access to a filtered electronic maintenance technical publication 220, or the electronic maintenance technical publication 218, is denied.

The personnel identification module 128 is also configured to obtain at least one credential of personnel 116 identified by the personnel identification module 128. The same, or similar, database storing the personal identification data stores credentials of the personnel 116. The credentials of personnel 116 may be tied to the personal identification data of the personnel 116 such that identification of the personnel 116 results in the automatic identification or obtaining of the credentials of the personnel 116. A credential can be any of various qualifications of personnel 116 associated with maintenance of the aircraft 102. For example, in one implementation, a credential of personnel 116 can be a technical expertise, such as electrician, computer programmer, inspector, and the like, of the personnel 116. Similarly, a credential of personnel 116 can be an educational degree or certification, such as electrical engineer, mechanical engineer, FAA-certified mechanic, etc., of the personnel 116. In certain implementations, a credential of personnel 116 can be a security credential or security clearance of the personnel 116.

In one embodiment, the data filter 124 is configured to automatically filter maintenance-procedure data from the electronic maintenance technical publication 218 responsive to, at least in part, at least one credential of the personnel 116 as determined by the personnel identification module 128. Filtering maintenance-procedure data from the electronic maintenance technical publication 218 can include retrieving or separating, from the rest of the maintenance-procedure data in the electronic maintenance technical publication 218, only the maintenance-procedure data relevant to the at least one credential of the personnel 116 and/or the maintenance-procedure data authorized to be viewed by personnel 116 having the at least one credential.

According to certain embodiments, the data filter 124 is configured to create a filtered electronic maintenance technical publication 220 responsive to either the proximity of personnel 116 to the aircraft 102, as determined by the personnel location device 117, or the at least one credential of the personnel 116, as determined by the personnel identification module 128. However, in other embodiments, the data filter 124 is configured to create a filtered electronic maintenance technical publication 220 responsive to both the proximity of personnel 116 to the aircraft 102 and the at least one credential of the personnel 116. For example, in one implementation, the data filter 124 is configured to create a first filtered electronic maintenance technical publication responsive to one of the proximity of personnel 116 to the aircraft 102 and the at least one credential of the personnel 116, and to create a second filtered electronic maintenance technical publication responsive to the other of the proximity of personnel 116 to the aircraft 102 and the at least one credential of the personnel 116. The first filtered electronic maintenance technical publication includes maintenance-procedure data filtered from the electronic maintenance technical publication 218 (e.g., non-filtered electronic maintenance technical publication). In contrast, the second filtered electronic maintenance technical publication includes maintenance-procedure data filtered from the first electronic maintenance technical publication. Accordingly, the second filtered electronic maintenance technical publication 220 is smaller or contains less maintenance-procedure data than the first electronic maintenance technical publication.

As defined herein, personnel 116 can refer to a single person or a group of persons. Generally, personnel 116 is one or more aircraft maintenance technicians trained to perform maintenance on an aircraft. However, personnel 116 can be any one or more persons associated with maintenance of a complex structure. Referring to FIG. 1, two personnel 116 are shown with each handling a separate mobile device 118. In this manner, two or more personnel 116 proximate different objects of the aircraft 102 can operate a respective mobile device 118 to separately and independently filter the electronic maintenance technical publication 218 for performing maintenance on different objects of the aircraft 102.

Figure 2:
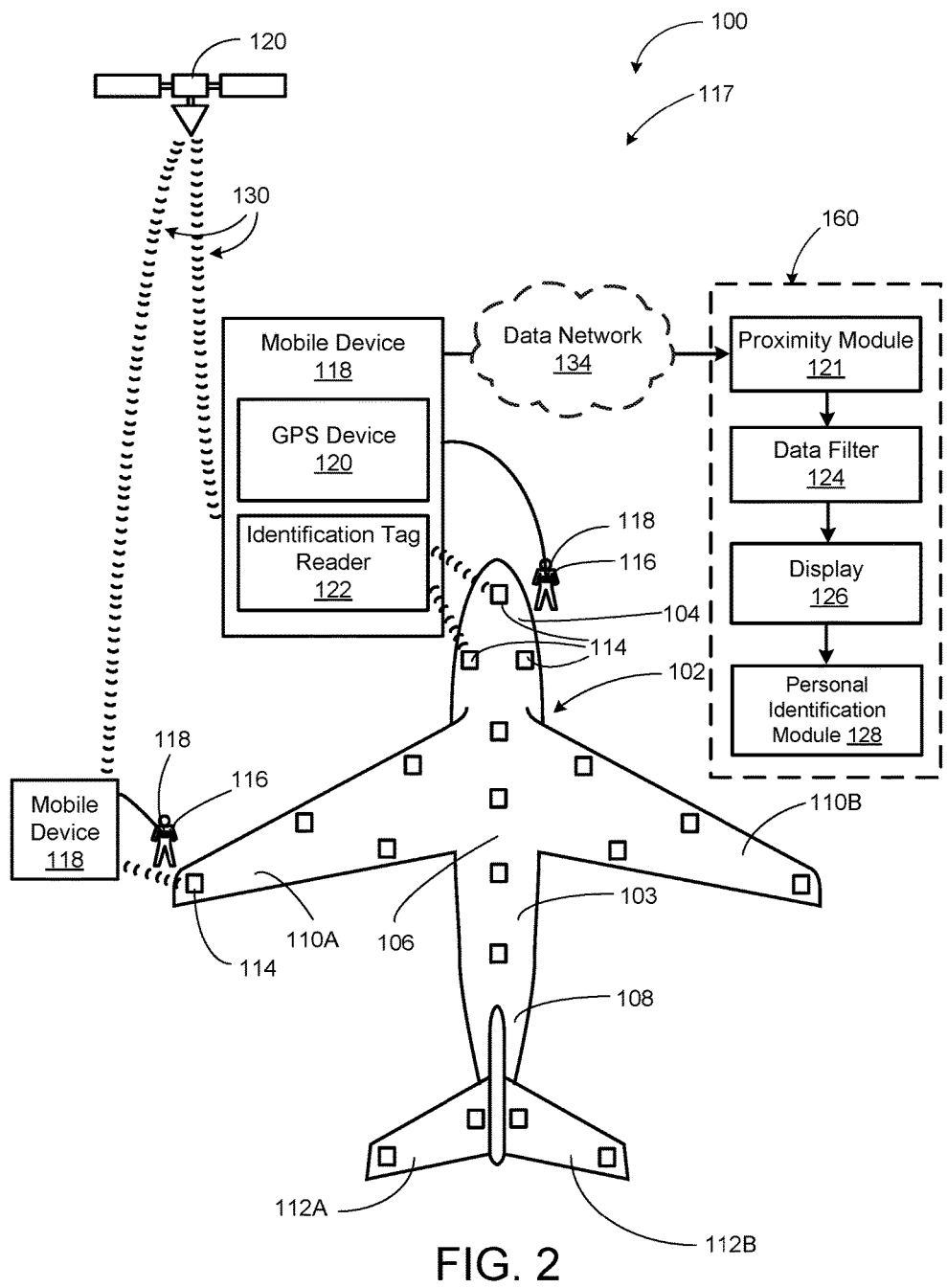
FIG. 2 is a schematic block diagram of a system for maintaining a structure, according to one or more embodiments of the present disclosure.

Referring to FIG. 2, in some embodiments, at least one of the proximity module 121, data filter 124, display 126, and personnel identification module 128 is physically separate from the mobile device 118. For example, in such embodiments, the mobile device 118 may configured to operate substantially solely as a GPS device 120 and a tag reader 122 to obtain 3-D position data of personnel 116. Software, firmware, and/or hardware for performing the operations of at least one of the proximity module 121, data filter 124, display 126, and personnel identification module 128 can then be off-loaded to single separate device 160, in one implementation, or multiple separate devices, in another implementation. Secure communication of 3-D position data from the mobile device 118 to the proximity module 121 can be facilitated by a data communication system, which can include a wired and/or wireless communication line and can utilize a data network 134. Secure communication of data between the proximity module 121, data filter 124, display 126, and personnel identification module 128 may also be facilitated by a similar data communication system.

The data network 134 can be a wireless network, such as a wireless telephone network, a local wireless network, such as a Wi-Fi network, a Bluetooth® network, and the like. Similarly, the data network 134 can include other wireless-type communications, such as optical communications (e.g., laser and infrared) and electromagnetically-generated communications (e.g., radio waves). In another embodiment, the data network 134 includes a wide area network ("WAN"), a storage area network ("SAN"), a local area network ("LAN"), an optical fiber network, the internet, or other data network known in the art. The data network 134 can include two or more networks. In a further embodiment, the data network 134 includes one or more servers, routers, switches, and/or other networking equipment. Moreover, the data network 134 can include computer readable storage media, such as a hard disk drive, a mass storage unit, an optical drive, non-volatile memory, random access memory ("RAM"), or the like.

Referring to FIG. 3, another embodiment of a system 200 for maintaining a structure is shown. The system 200 includes the personnel location device 117, which determines a personnel proximity 214, and the personnel identification module 128, which determines personnel credentials 216.

The personnel location device 117 receives structure GPS data 206 and at least one of personnel GPS data 208 or identification tag data 210. The structure GPS data 206 includes 3-D position data of the structure, including 3-D position data of each of various objects of the structure. The personnel GPS data 308 includes 3-D position data of personnel 116 obtained from a GPS device. The identification tag data 210 includes data, obtained from an identification tag fixed to the structure, regarding the object to which the identification tag is fixed and the intensity, or other characteristics, of the signal received by an identification tag reader from the identification tag. The personnel location device 117 determines the personnel proximity 214, which identifies the object or objects of the structure in closest proximity to the personnel 116, based on, at least in part, the structure GPS data 206 and the personnel GPS data 208, and/or the identification tag data 210. In one implementation, the personnel location device 117 determines the personnel proximity 214 by calculating a distance between a 3-D position of an object of the structure and a 3-D position of the personnel 116. In the same, or alternative, implementation, the personnel location device 117 determines the personnel proximity 214 by calculating a distance between an identification tag reader and the identification tag fixed to the object of the structure based on, for example, the intensity of the signal received by the identification tag reader from the identification tag.

The personnel identification module 128 receives unique identification data 212 from personnel 116 and compares the unique identification data 212 with personal identification data stored in an authorization database 260 of a personnel database 204. When the unique identification data 212 corresponds with personal identification data stored in the authorization database 260, the identity of the personnel 116 is verified. Additionally, contingent on the verification of the identity of the personnel 116, the personnel identification module 128 verifies or obtains one or more credentials of the personnel 116 from a credential database 262 of the personnel database 204. The credentials of the personnel 116 obtained by the personnel identification module 128 are identified by the personnel credentials 216.

The system 200 also includes the data filter 124. Based on the personnel proximity 214, the personnel credentials 216, or both the personnel proximity 214 and the personnel credentials 216, the data filter 124 filters maintenance-procedure data from the electronic maintenance technical publication 218 to create the filtered electronic maintenance technical publication 220. In one implementation, the data filter 124 filters maintenance-procedure data from the electronic maintenance technical publication 218 based on just one of the personnel proximity 214 and the personnel credentials 216. In contrast, in other implementations, the data filter 124 filters maintenance-procedure data from the electronic maintenance technical publication 218 based on both of the personnel proximity 214 and the personnel credentials 216. The filtered electronic maintenance technical publication 220 is then displayed on a display 126 of the system 200.

Figure 4:
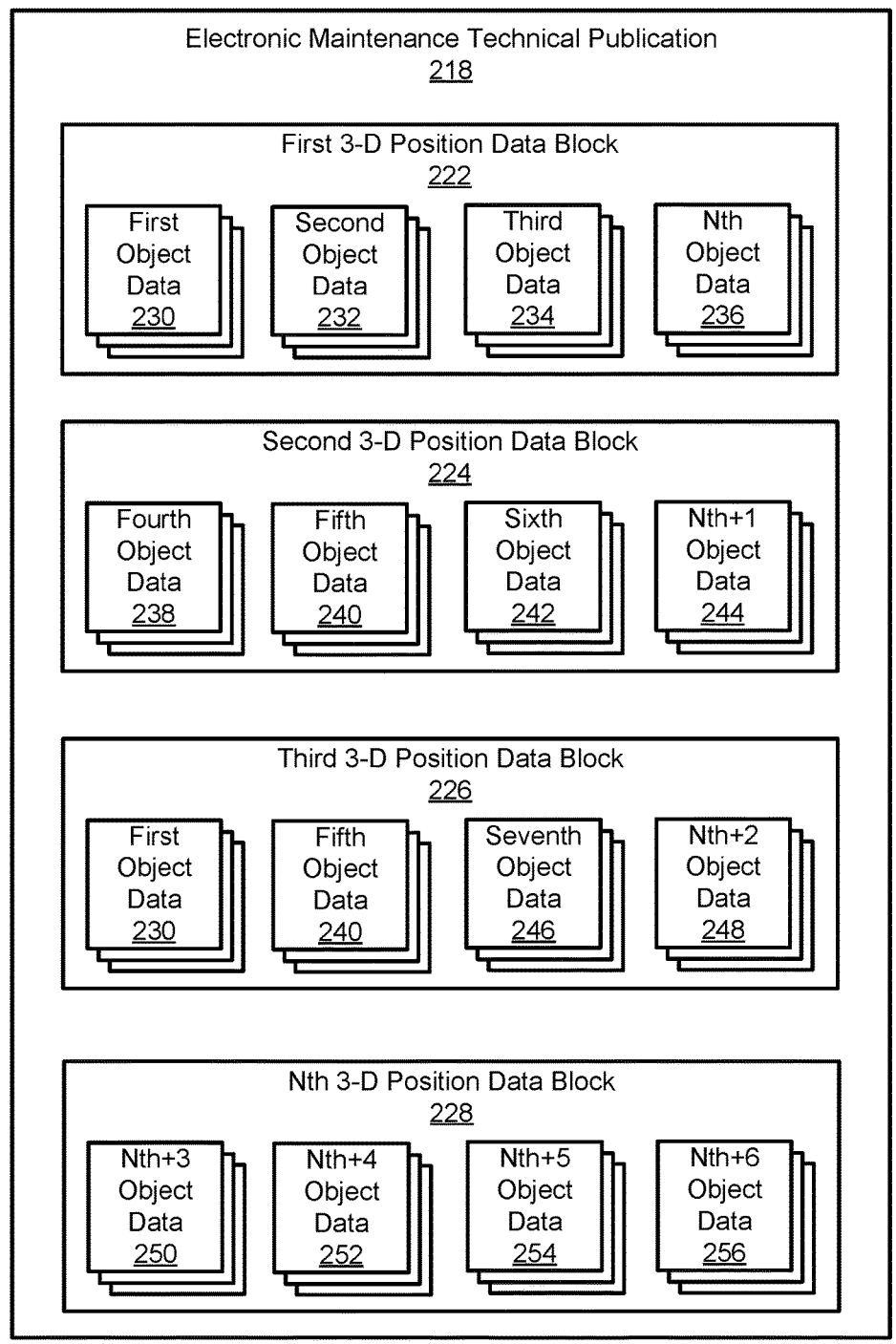
FIG. 4 is a schematic block diagram of an electrical maintenance technical publication, according to one or more embodiments of the present disclosure.

As shown in FIG. 4, the electronic maintenance technical publication 218 is indexed by 3-D position of personnel 116 relative to the structure. Conventionally, an electronic maintenance technical publication for a structure is indexed by type of object, alphabetical order, frequency of maintenance, size of object, and/or the like. However, the electronic maintenance technical publication 218 of the present disclosure is indexed by 3-D position of personnel 116 relative to the structure to promote compliancy with the systems 100, 200 described herein. In other words, the electronic maintenance technical publication 218, being indexed by 3-D position of personnel 116 relative to the structure, facilitates quick and efficient filtering of the maintenance-procedure data of the electronic maintenance technical publication 218 by the 3-D position of personnel 116 relative to the structure as determined by the systems 100, 200.

According to some implementations, the electronic maintenance technical publication 218 includes multiple data blocks each indexed according to a different 3-D position of personnel 116 relative to a structure. For example, the electronic maintenance technical publication 218 includes a first 3-D position data block 222, a second 3-D position data block 224, a third 3-D position data block 226, and any additional 3-D position data blocks up to an Nth 3-D position data block 228.

The maintenance-procedure data for an object is identified as object data and can include one or more electronic pages, graphics, or other media of information associated with the maintenance of the object. For example, the first 3-D position data block 222 includes first object data 230, including maintenance-procedure data for a first object of the structure, second object data 232, including maintenance-procedure data for a second object of the structure, third object data 234, including maintenance-procedure data for a third object of the structure, and any additional object data, including maintenance-procedure data for any additional objects, up to Nth object data 236. Similarly, the second 3-D position data block 224 includes fourth object data 238, including maintenance-procedure data for a fourth object of the structure, fifth object data 240, including maintenance-procedure data for a fifth object of the structure, sixth object data 242, including maintenance-procedure data for a sixth object of the structure, and any additional object data, including maintenance-procedure data for any additional objects, up to Nth+1 object data 244. Likewise, the third 3-D position data block 226 includes seventh object data 246, including maintenance-procedure data for a seventh object of the structure, and any additional object data, including maintenance-procedure data for any additional objects, up to Nth+2 object data 248. However, the third 3-D position data block 226 includes at least some of the same object data found in other data blocks. For example, the third 3-D position data block 226 includes the first object data 230 and the fifth object data 240. Finally, the Nth 3-D position data block 228 includes Nth+3 object data 250, Nth+4 object data 252, Nth+5 object data 254, and Nth+6 object data 256.

Generally, the maintenance-procedure data in each data block corresponds with one or more objects of the structure in closest proximity to a different potential 3-D position of the personnel 116. For example, when the personnel 116 is in a first 3-D position relative to the structure, the data filter 124 will retrieve the maintenance-procedure data from the object data of the first 3-D position data block 222 of the electronic maintenance technical publication 218, and include only the retrieved maintenance-procedure data from the first 3-D position data block 222 in the filtered electronic maintenance technical publication 220. Similarly, as an example, when the personnel 116 is in, or moves into, a second 3-D position relative to the structure, the data filter 124 will retrieve the maintenance-procedure data from the object data of the second 3-D position data block 224 of the electronic maintenance technical publication 218, and include (or replace maintenance-procedure data from another 3-D position block with) only the retrieved maintenance-procedure data from the second 3-D position data block 224 in the filtered electronic maintenance technical publication 220. In certain implementations, the 3-D position of the personnel 116 is approximated to the closest one of the 3-D positions associated with the 3-D position data blocks of the electronic maintenance technical publication 218.

According to some embodiments, the electronic maintenance technical publication 218 can be initially, or further, indexed by the credentials of the personnel 116. For example, in one implementation, the maintenance-procedure data of each 3-D position data block of the electronic maintenance technical publication 218 can be further indexed according to the credentials of the personnel 116. Accordingly, each 3-D position data block can include one or more credential data blocks each having one or more object data corresponding with the maintenance of objects tied to the credential of the credential data block. In another implementation, the electronic maintenance technical publication 218 is initially indexed by the credentials of the personnel 116 to have one or more credential data blocks each having one or more object data corresponding with the maintenance of objects tied to the credential of the credential data block. Then, optionally, the maintenance-procedure data of each credential data block can be further indexed according to the 3-D position of the personnel 116.

Figure 5:
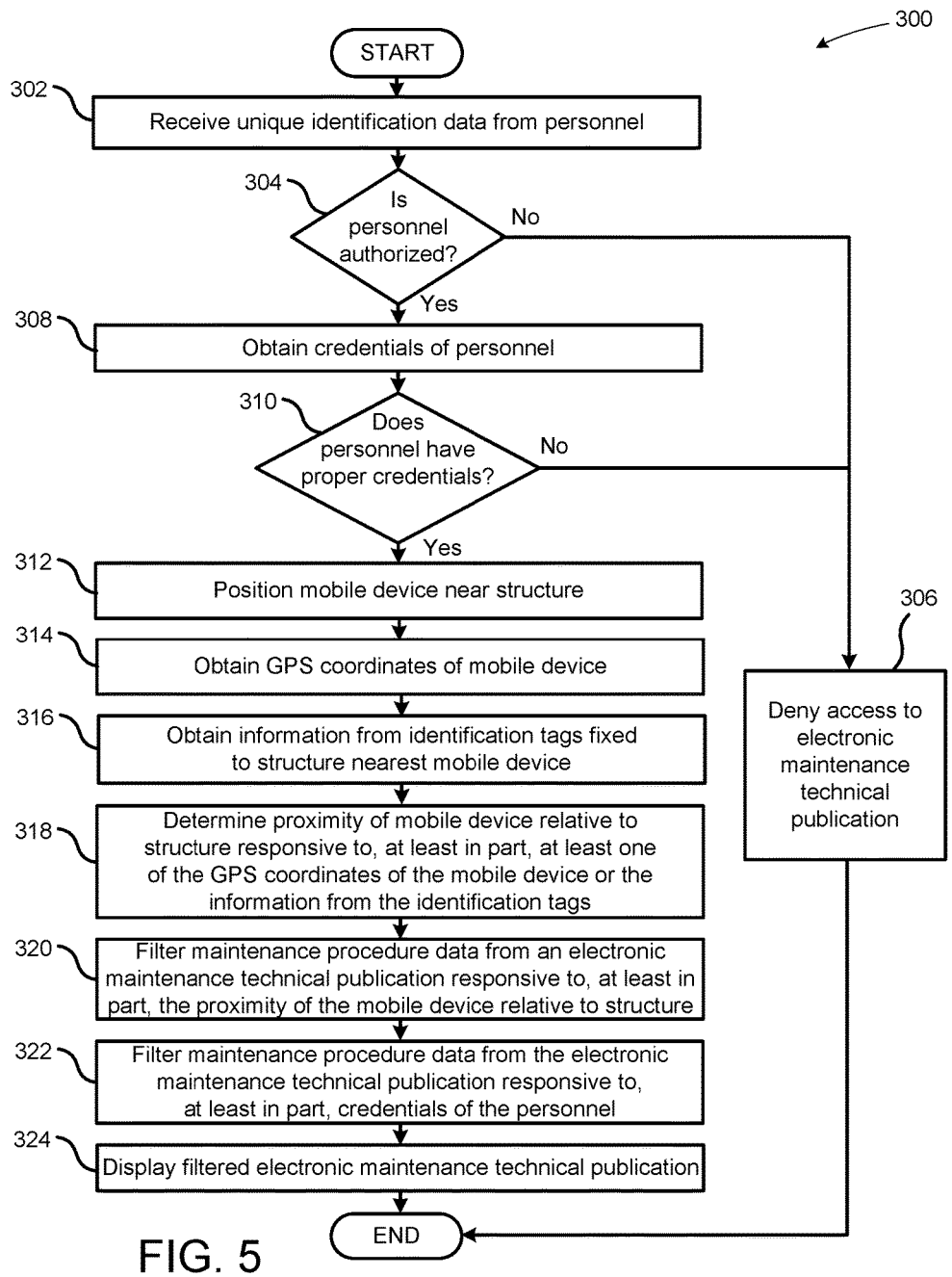
FIG. 5 is a schematic flow diagram of a method of maintaining a structure, according to one or more embodiments of the present disclosure.

Referring to FIG. 5, one embodiment of a method 300 of maintaining a structure, such as the aircraft 102, includes receiving unique identification data from personnel at 302. The method 300 include determining whether the personnel is authorized or identified at 304 based on the unique identification data. If the personnel is not authorized at 304 (e.g., the unique identification data is not recognized), then the method 300 proceeds to deny access to an electronic maintenance technical publication at 306. However, if the personnel is authorized at 304 (e.g., the unique identification data is recognized), then the method 300 proceeds to obtain credentials of the personnel at 308. The method 300 additionally includes determining whether the credentials are proper at 310. If the credentials of the personnel are not proper (e.g., the credentials are expired or the personnel has no credentials), then the method 300 proceeds to deny access to the electronic maintenance technical publication at 306. But, if the credentials of the personnel are proper, then the method 300 proceeds to determine the proximity of a mobile device relative to the structure at 318.

The method 300 further includes positioning the mobile device near the structure at 312. In some implementations, the mobile device is positioned proximate an object of the structure that may require maintenance. While in the position near the structure, the method 300 includes obtaining GPS coordinates or the 3-D position of the mobile device at 314 in some implementations. Additionally, or alternatively, while in the position near the structure, the method 300 includes obtaining information from identification tags fixed to the structure nearest the mobile device at 316. Determining the proximity of the mobile device relative to the structure at 318 is responsive to, at least in part, at least one of the GPS coordinates of the mobile device, obtained at 314, or the information from the identification tags, obtained at 316.

Furthermore, in some implementations, the method 300 includes filtering maintenance-procedure data from an electronic maintenance technical publication responsive to, at least in part, the proximity of the mobile device relative to the structure at 320. In the same, or an alternative, implementation, the method 300 includes filtering maintenance-procedure data from the electronic maintenance technical publication responsive to, at least in part, the credentials of the personnel at 322. In some implementations, the method 300 includes only one or both of the steps 320, 322. In implementations where the method 300 includes both of the steps 320, 322, the step 320 can be performed before step 322, or the step 322 can be performed before the step 320. The method 300 also includes displaying a filtered electronic maintenance technical publication at 324. The filtered electronic maintenance technical publication includes only the maintenance-procedure data filtered from the electronic maintenance technical publication at step 320 and/or step 322.

According to one embodiment, the first step in the method 300 can be step 312, such that steps 302-310 and 322 are skipped or otherwise not included. In yet one embodiment, steps 312-320 of the method 300 can be skipped.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive.

What is claimed is:

1. An apparatus, comprising:
   a personnel location device, configured to determine a proximity of personnel to a structure; and
   a data filter, configured to:
      filter maintenance-procedure data from an electronic maintenance technical publication responsive to, at least in part, the proximity of personnel to the structure determined by the personnel location device, wherein the electronic maintenance technical publication is a manual corresponding to the structure, wherein the maintenance-procedure data is indexed by position of the personnel relative to the structure; and
      create a first filtered electronic maintenance technical publication comprising the maintenance-procedure data filtered from the electronic maintenance technical publication.

2. The apparatus of claim 1, wherein the personnel location device comprises a global positioning system (GPS) device.

3. The apparatus of claim 2, wherein:
   the personnel location device further comprises a data storage device comprising information identifying GPS coordinates of multiple objects of the structure;
   the personnel location device is further configured to determine an object of the structure in closest proximity to the personnel; and
   the maintenance-procedure data filtered from the electronic maintenance technical publication by the data filter consists of maintenance-procedure data corresponding with the object of the structure in closest proximity to the personnel.

4. The apparatus of claim 1, wherein the personnel location device comprises:
   identification tags, fixed to respective objects of multiple objects of the structure and each comprising information identifying the respective object to which the identification tag is fixed; and
   an identification tag reader, configured to detect identification tags and receive the information identifying the objects from the identification tags.

5. The apparatus of claim 4, wherein:
the tag reader is configured to detect the identification tag in closest proximity to the personnel and receive information from the identification tag identifying the object to which the identification tag in closest proximity to the personnel is fixed;
the personnel location device is further configured to determine an object of the structure in closest proximity to the personnel responsive to the information from the identification tag identifying the object to which the identification tag in closest proximity to the personnel is fixed; and
the maintenance-procedure data filtered from the electronic maintenance technical publication by the data filter consists of maintenance-procedure data corresponding with the object of the structure in closest proximity to the personnel.

6. The apparatus of claim 5, wherein the maintenance-procedure data corresponding with the object of the structure in closest proximity to the personnel consists of maintenance-procedure data for the object of the structure in closest proximity to the personnel and maintenance-procedure data for objects near the object of the structure in closest proximity to the personnel.

7. The apparatus of claim 1, further comprising a personnel identification module, configured to:
identify the personnel; and
obtain at least one credential of the personnel responsive to, at least in part, an identification of the personnel by the personnel identification module.

8. The apparatus of claim 7, wherein the data filter is further configured to:
filter maintenance-procedure data from the first filtered electronic maintenance technical publication responsive to, at least in part, the at least one credential of the personnel determined by the personnel identification module; and
create a second filtered electronic maintenance technical publication comprising the maintenance-procedure data filtered from the first filtered electronic maintenance technical publication.

9. The apparatus of claim 8, wherein the at least one credential of the personnel comprises a technical expertise.

10. The apparatus of claim 7, wherein the personnel identification module identifies the personnel responsive to, at least in part, unique identification data received from the personnel.

11. A system, comprising:
an electronic maintenance technical publication, comprising maintenance-procedure data corresponding with multiple objects of a structure, wherein the electronic maintenance technical publication is indexed by position of personnel relative to a structure;
a personnel location device, configured to determine a proximity of the personnel to the structure;
a data filter, configured to:
access the electronic maintenance technical publication;
filter maintenance-procedure data from the electronic maintenance technical publication responsive to, at least in part, the proximity of personnel to the structure determined by the personnel location device; and
create a first filtered electronic maintenance technical publication comprising the maintenance-procedure data filtered from the electronic maintenance technical publication; and a display, configured to display the first filtered electronic maintenance technical publication.

12. The system of claim 11, wherein the structure comprises an aircraft and the multiple objects comprise separate components or assemblies of the aircraft.

13. The system of claim 11, further comprising a personnel database, comprising credentials of the personnel, wherein the data filter is further configured to:
access the personnel database to obtain credentials of the personnel;
filter maintenance-procedure data from the first filtered electronic maintenance technical publication responsive to, at least in part, the at least one credential of the credentials of the personnel; and
create a second filtered electronic maintenance technical publication comprising the maintenance-procedure data filtered from the first filtered electronic maintenance technical publication.

14. The system of claim 11, wherein:
the personnel location device comprises a mobile device; and
the mobile device comprises the data filter.

15. The system of claim 13, wherein the electronic maintenance technical publication is indexed by-at least one credential of the personnel.

16. The system of claim 11, wherein the personnel location device comprises:
a global positioning system (GPS) device;
identification tags, fixed to respective objects of multiple objects of the structure and each comprising information identifying the respective object to which each of the identification tags is fixed; and
an identification tag reader, configured to detect identification tags and receive the information identifying the objects from the identification tags.

17. A computer program product comprising a non-transitory computer readable storage medium having program instructions embodied therewith, the program instructions readable/executable by a processor to cause the processor to:
determine a proximity of personnel to a structure;
filter maintenance-procedure data from an electronic maintenance technical publication responsive to, at least in part, the proximity of personnel to the structure, wherein the maintenance technical publication is indexed by position of the personnel relative to the structure; and
create a first filtered electronic maintenance technical publication comprising the maintenance-procedure data filtered from the electronic maintenance technical publication.

18. The computer program product of claim 17, the program instructions further causing the processor to:
obtain at least one credential of the personnel; and
filter maintenance-procedure data from the first filtered electronic maintenance technical publication responsive to, at least in part, the at least one credential of the personnel; and
create a second filtered electronic maintenance technical publication comprising the maintenance-procedure data filtered from the first filtered electronic maintenance technical publication.

19. The computer program product of claim 17, wherein determining the proximity of the personnel to the structure comprises:
determining a first precursor proximity of the personnel to the structure responsive to, at least in part, global positioning system (GPS) data received from a mobile device fixed to the personnel;
determining a second precursor proximity of the personnel to the structure responsive to, at least in part, information on identification tags fixed to the structure and received from an identification tag reader; and
comparing the first precursor proximity and the second precursor proximity.

20. A method, comprising:
obtaining at least one credential of personnel; and
filtering maintenance-procedure data from an electronic maintenance technical publication responsive to, at least in part, the at least one credential of the personnel; and
creating a first filtered electronic maintenance technical publication comprising the maintenance-procedure data filtered from the electronic maintenance technical publication, wherein the maintenance-procedure data is indexed by the at least one credential.

21. The method of claim 20, further comprising:
determining a proximity of the personnel to a structure;
filtering maintenance-procedure data from the first filtered electronic maintenance technical publication responsive to, at least in part, the proximity of the personnel to the structure; and
creating a second filtered electronic maintenance technical publication comprising the maintenance-procedure data filtered from the first filtered electronic maintenance technical publication.

22. An apparatus, comprising:
a personnel identification module, configured to:
identify personnel; and
obtain at least one credential of the personnel responsive to, at least in part, an identification of the personnel by the personnel identification module; and
a data filter, configured to:
filter maintenance-procedure data from an electronic maintenance technical publication responsive to, at least in part, the at least one credential of the personnel determined by the personnel identification module, wherein the maintenance-procedure data is indexed by the at least one credential; and
create a first filtered electronic maintenance technical publication comprising the maintenance-procedure data filtered from the electronic maintenance technical publication.

23. The apparatus of claim 22, further comprising a personnel location device, configured to determine a proximity of personnel to a structure, wherein the data filter is further configured to:
filter maintenance-procedure data from the first filtered electronic maintenance technical publication responsive to, at least in part, the proximity of the personnel determined by the personnel location device; and
create a second filtered electronic maintenance technical publication comprising the maintenance-procedure data filtered from the first filtered electronic maintenance technical publication.

24. The apparatus of claim 22, further comprising a display, configured to display the first filtered electronic maintenance technical publication.

25. A method, comprising:
determining a proximity of personnel to a structure; and
filtering, at a mobile device, maintenance-procedure data from an electronic maintenance technical publication responsive to, at least in part, the proximity of the personnel to the structure, wherein the maintenance-procedure data is indexed by position of the personnel to the structure; and
creating, at the mobile device, a first filtered electronic maintenance technical publication comprising the maintenance-procedure data filtered from the electronic maintenance technical publication.

26. The method of claim 25, further comprising:
obtaining at least one credential of the personnel;
filtering maintenance-procedure data from the first filtered electronic maintenance technical publication responsive to, at least in part, the at least one credential of the personnel; and
creating a second filtered electronic maintenance technical publication comprising the maintenance-procedure data filtered from the first filtered electronic maintenance technical publication.

* * * * *